No. 716,829. Patented Dec. 23, 1902.
J. A. E. CRISWELL.
MACHINE FOR MAKING MATCHES.
(Application filed Oct. 1, 1901.)

(No Model.) 2 Sheets—Sheet 1.

WITNESSES:
INVENTOR
J. A. E. Criswell

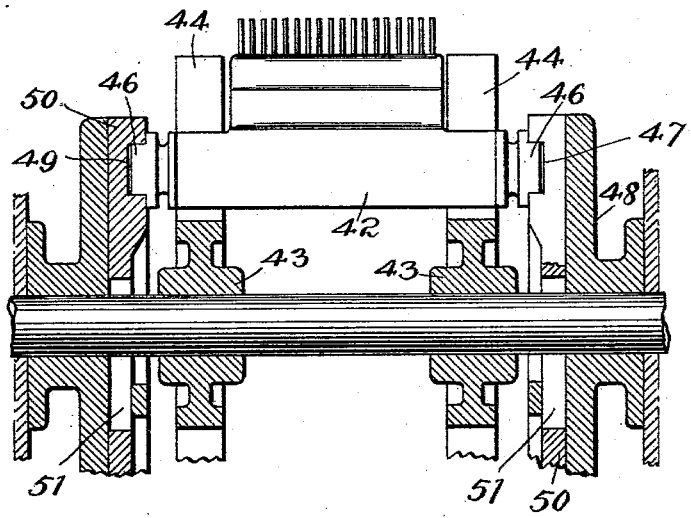

UNITED STATES PATENT OFFICE.

JAMES A. EKIN CRISWELL, OF NEW YORK, N. Y.

MACHINE FOR MAKING MATCHES.

SPECIFICATION forming part of Letters Patent No. 716,829, dated December 23, 1902.

Application filed October 1, 1901. Serial No. 77,224. (No model.)

*To all whom it may concern:*

Be it known that I, JAMES A. EKIN CRISWELL, of New York, county of Kings, and State of New York, have invented certain new and useful Improvements in Machines for Making Matches, of which the following is a full, clear, and exact description.

This invention relates to match-making machines, and more particularly to the class of machines in which the splints are cut and placed in a hopper and from there transferred to a suitable carrier.

One object of the invention is to provide simple and efficient means whereby the splints may be readily and properly positioned in a hopper and successive rows of splints forced from the hopper into a suitable carrier and by the latter carrier transferred bodily and forced into a second carrier or holding means.

A further object of the invention is to provide a simple and efficient transfer-carrier for the splints.

With these and other objects in view the invention consists in the construction and combination of the several parts, substantially as hereinafter described, and then pointed out in the claims at the end of the description.

Figure 1:
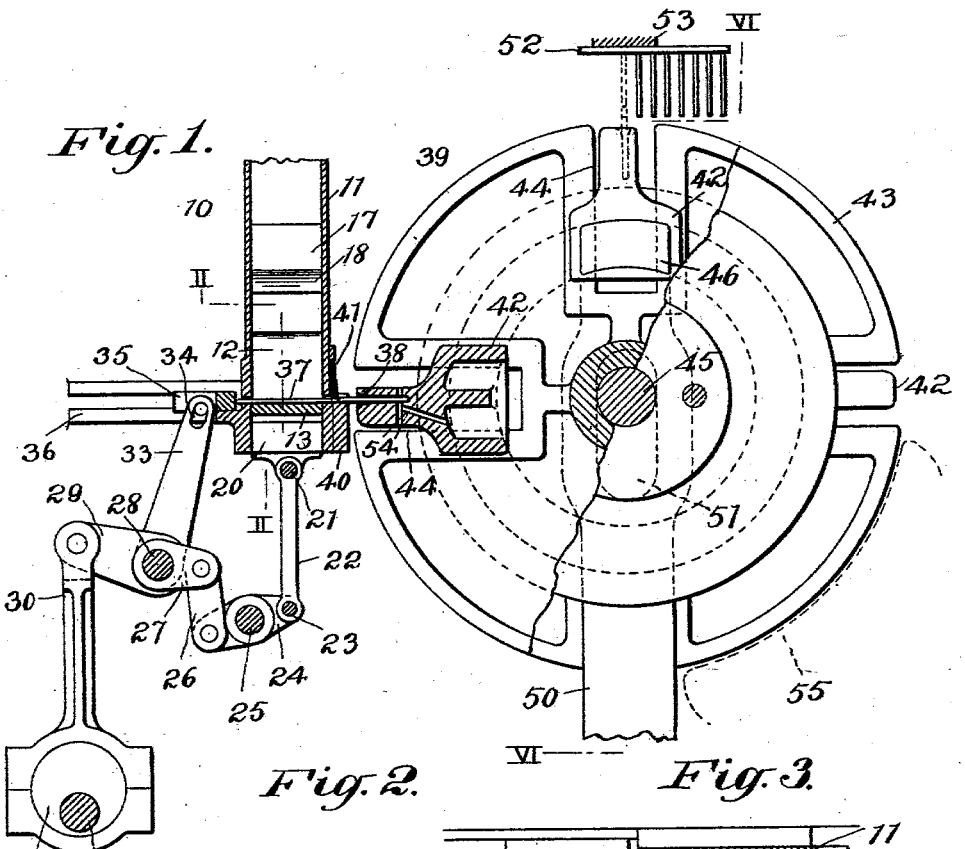
Figures 2, 3:
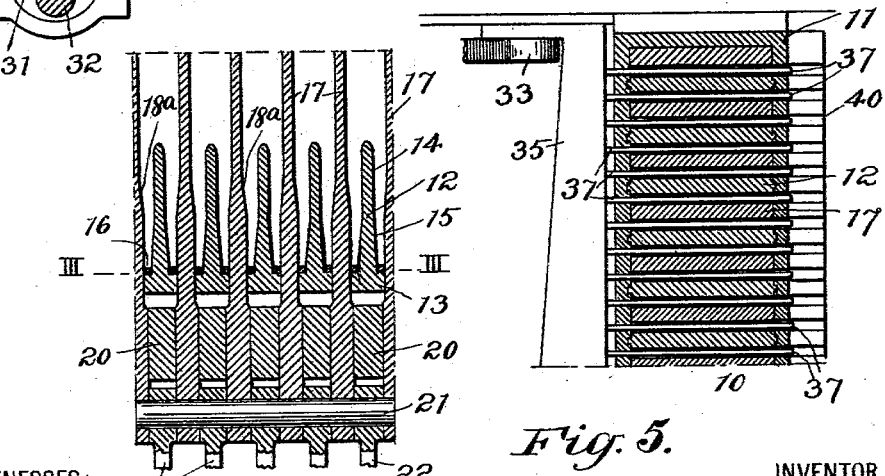
Figures 4, 5:
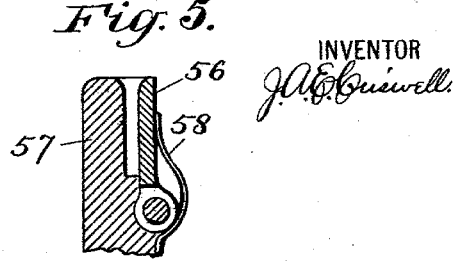

In the drawings, wherein similar figures of reference designate similar parts, Figure 1 is a fragmentary section, partly in elevation, of one form of machine embodying my invention. Fig. 2 is a fragmentary vertical section, on an enlarged scale, taken on the line II II of Fig. 1. Fig. 3 is a fragmentary sectional plan view through the hopper, taken on the line III III of Fig. 2. Fig. 4 is a fragmentary vertical section showing the upper portion of the partitions or ribs within the hopper. Fig. 5 is a fragmentary view showing how the movable parts of the transfer-carrier may comprise yieldingly-held jaws, and Fig. 6 is a fragmentary vertical section taken on the line VI VI of Fig. 1.

The splints are cut by any suitable means and prepared for assembling in the usual or in any preferred manner and are placed in the hopper 10. This hopper comprises a casing or box 11, within and to which are secured the walls 12. The walls, ribs, or partitions 12 are fixed to the casing 11 and are each provided with a base 13 and an extended portion 14. This extended portion 14 is straight for part of its length and is gradually tapering, as at 15, toward the base 13, so as to form receivers or recesses 16 between said walls or devices 12 and the walls or partitions 17. These walls, partitions, or devices 17 are somewhat longer than the extended portions 14 of the partitions 12 and are suitably guided in the casing 11, so as to be vertically movable therein. The walls or partitions 17 are provided with inclined plates or ribs 18, by which the splints during the reciprocation of said walls assist in agitating the splints and cause the latter to fall downward, properly arranged, into the recesses 16 between the partitions 12 and 17. The partitions 17 may be also tapered, as at 18$^a$, and have their lower portions guided between the ribs or guides 20, the latter being rigidly secured to the hopper-casing.

The lower ends of the vibrating walls 17 are secured to the shaft or rod 21, and on this latter rod are a number of connecting rods or links 22. These links 22 may be of any suitable number. The links 22 are connected at their lower ends to the rod or shaft 23, and said rod is carried by the ends of rock-levers 24. The rock-levers 24 are arranged on a shaft 25, and the other ends of said rock-levers are connected to the links 26. The links 26 are connected to the arms 27, that are secured to a rock-shaft 28. One or more arms 29 are secured to the rock-shaft 28, and said arm or arms 29 are connected to an eccentric-strap 30, operated by an eccentric 31 on the shaft 32. As the shaft 32 is rotated the eccentric-strap 30 will operate the arm or arms 29, rock-shaft 28, arms 27, links 26, and through the rock-levers 24 and links or connecting-rods 22 the partitions or devices 17 will be given a rapid vibration. This vibration is imparted to the splints within the hopper to agitate the latter and cause them to drop and be properly positioned in the recesses 16, as best shown in Fig. 2.

The shaft 28 has one or more arms 33, usually two, secured thereto. The upper end of the arms 33 are slotted, as at 34, and are connected to a slide or head 35. This head 35 is slidingly held in the guides 36, and to the head 35 are secured a series of plungers 37.

The plungers 37 correspond in position and number to the recesses 16 of the hopper and at each oscillation of the shaft 27 the arms 33 will reciprocate the head 34 and will force a row of properly-spaced splints from the recesses 16 into holding devices 38 of the carrier 39. A grooved guide 40 is arranged on the casing 11 to assist in guiding the splints to the holding devices or receivers 38, and a brush 41 is secured to the casing 11 in order that only one splint will be forced out of said hopper by each plunger.

As a means for transferring the splints and for forcibly inserting them into a suitable carrier various means may be employed. The transfer-carrier 39 has a series of revoluble and reciprocatory slides 42, in which are arranged the receivers or holding devices 38. The slides 42 are held in the wheels or disks 43 and are adapted to move radially in the slots 44 of said wheels. The wheels 43 are secured to a shaft 45, the said shaft being suitably journaled in the frame and adapted to have intermittent rotary movement imparted thereto in any suitable manner. The slides 42 have individual splint-receivers or holding devices 38 for each splint, and the slides have their ends 46 extended and are adapted to normally move in annular grooves 47 in stationary or fixed flanges or disks 48, that are secured to the frame of the machine. The ends 46 normally move in the annular grooves 47 and in moving from a horizontal to a vertical position will ride into transverse grooves 49 of reciprocatory bars 50. The grooves 49 of the bars 50 normally register with the annular grooves 47 of the disks or flanges 48 and are suitably guided in vertical slots in said disks or flanges. The bars 50 are provided with slots 51 in order that said bars may span the shaft 45, and said bars are given a reciprocatory movement by any suitable means. As the shaft 45 and wheels 43 are rotated they will carry the slide that has just received splints to a vertical position, so that the ends 46 thereof will enter the grooves 49 of the bars 50. At this time a quick reciprocatory movement will be imparted to the bars, which will carry and force the uppermost slide upward to stick and leave the splints in the carrier 52, a plate or other means 53 being provided to take the thrust during the sticking operation. The slide is returned by the bars to its former position, so that at the next movement of the wheels 43 the ends of said slide will enter and travel in the annular grooves 47 of the disks or flanges 48. The splints may be received by one slide or section at the same time that another slide is discharging splints into the carrier.

No mechanism is shown herein for operating the bars 49 or for rotating the shaft 45, as any suitable means, or means substantially the same as shown in my application, Serial No. 54,618, filed April 6, 1901, may be employed, and in which latter application transfer means of the character shown is broadly claimed.

The carrier 52 may be of any suitable form and may be passed to and through the machine in any suitable manner, and its position relatively with respect to the position of the other parts of the machine may vary. As shown, the carrier or holding means 52 comprises the usual plates, in which are holes to compress and hold the ends of the splints. The splints may be fed to and through the machine separately and the matches completed by hand, or the said parts may be arranged so that the matches may be completed automatically in the usual way, ejecting mechanism being provided to force the splints from the carrier if the latter is of such a nature as to require such mechanism.

The slides or sections 42 may have openings 54 therein, and said slides may be caused to pass within the path of a chute or pipe 55. This pipe or chute is shown in dotted lines in Fig. 1 and is connected to an exhaust or other fan, so as to subject the slides or sections to the action of air during their rotary movement to remove any particles of dust, fiber, and the like that might remain in the holding devices 38.

So far as the transfer-carrier is concerned, the construction and operation of the same is substantially identical with that shown in my application hereinbefore referred to, except that the slides in said application receive a series of rows instead of a single row.

From the foregoing it will be seen that simple and efficient means is provided whereby splints may be properly positioned in a suitable hopper or holding device for the splints, the latter being forced in single and separated rows from the hopper and the separated rows of splints taken by a transfer-carrier and forcibly inserted into a second carrier.

It will be understood that either round or square or other forms of splints may be assembled in such a machine and that various changes may be made without departing from the spirit of the invention. It will be further understood that the walls or partitions 12 and 17 of the hopper may be variously constructed and that either any part or all may be movable instead of simply the partitions 12 being stationary and that instead of a series of links or connecting-rods 22 being employed a link or rod at or near each end and connected to all the movable partitions or walls may be used instead of one for each wall, as shown.

In Fig. 5 the slide or section instead of having all of its parts fixed has a movable jaw or member 56. This jaw or member is hinged to the member 57 and yieldingly forced toward the latter by springs or other means 58, so that said jaws may be automatically or otherwise opened, as desired, to permit any particles of fiber that might remain in the receivers or holding devices 38 to be readily removed therefrom.

Having thus described my invention, what I claim as new, and desire to secure by Letters Patent, is—

1. In a match-making machine, the combination with a hopper or holding device holding splints *en masse*, of a series of intermittently circularly moving non-splint-separating and independent devices each receiving a row or line of splints endwise in succession, holding means for the splints, and means for moving the sections out of the circle of movement to forcibly insert the splints into the holding means.

2. In a match-making machine, the combination with a hopper adapted to hold splints, of a series of intermittent and circularly moving independent devices or slides having a series of independent openings or receivers each receiving in succession a row of separated splints direct from the hopper, plungers for forcing the splints from the hopper into the receivers of the slides, holding means for the splints, and means for moving the sections out of the circle of movement to forcibly insert the splints into the holding means.

3. In match-making machinery, the combination with a hopper adapted to hold complete splints, means for moving the splints so as to be properly arranged and held within the hopper, of a series of intermittently and circularly moving independent non-splint-separating devices each receiving in succession a row of splints endwise and carrying the splints bodily away from and clear of the hopper, plungers for forcing the successive rows of splints from the hopper to the devices, a holding or dipping carrier, and means for successively moving the devices out of the circle of movement to forcibly insert the splints into said carrier.

4. In match-making machinery, the combination with a hopper, of a series of circularly-moving independent devices each receiving in succession a row of separated splints endwise, means for moving the devices in unison, holding means for the splints, together with means for reciprocating the devices to stick and leave the splints in the holding means.

5. In a match-making machine, the combination with a hopper, of a series of intermittently revoluble and independent devices each receiving a row of separated splints direct from the hopper, a dipping-carrier, together with means for moving the devices in succession toward the carrier to place the separated splints therein.

6. In match-making machinery, the combination with means for holding splints *en masse*, of a movable transfer-carrier having a series of separate and independent non-splint-separating devices each receiving and holding a single row of splints endwise in succession, means for delivering a row of properly-separated splints to each section, a second or dipping carrier, and means for moving the devices independently of the movement of the transfer-carrier as a whole to place the splints in the second carrier.

7. In a match-making machine, the combination of a hopper, holding means for the splints, and a revoluble and reciprocatory non-splint-separating device receiving the splints endwise direct from the hopper and forcibly inserting them into said holding means.

8. In a machine for making matches, the combination with a hopper, and means for properly arranging the splints within said hopper, of a revoluble and reciprocatory device or slide receiving the splints endwise from the hopper and moving them bodily away from and clear of the hopper, a dipping-carrier, together with means for moving the device bodily to force and leave the splints in the carrier.

9. In a machine for making matches, the combination with a hopper, and means for arranging the splints within the hopper, of a revoluble and reciprocatory non-splint-separating device or slide receiving a row or line of separated splints endwise direct from the hopper, plungers for forcing the splints from the hopper to the slides, holding means for the splints, together with means for reciprocating the device to force and leave the splints in the holding means.

10. In a machine for making matches, the combination with a hopper, and means for arranging splints within the hopper, of a circularly movable and reciprocatory non-splint-separating device or slide receiving the splints endwise direct from the hopper, plungers for forcing a row or line of separated splints from the hopper to the device or slide, holding means for the splints, and means for reciprocating the device to place the splints in the holding means.

11. In a match-making machine, the combination with a hopper, of a series of independent devices each receiving a row of splints endwise in succession direct from the hopper, wheels for revolving the devices, and means for successively moving the devices radially in the wheels, and holding means for the splints.

12. In a match-making machine, the combination with a hopper or device holding splints *en masse*, of a non-splint-separating device receiving a row of separated splints endwise direct from the hopper, wheels for revolving the device and having a sliding connection with said device, a carrier, and means for moving the splint-carrying device radially in the wheels.

13. In a match-making machine, the combination with a hopper, of a device receiving the splints endwise direct from the hopper, plungers for forcing the splints from the hopper to the device, wheels for revolving the device and having a sliding connection with said device, a carrier, and means for moving the device radially in the wheels.

14. In a match-making machine, the combination with means for holding splints in quantity or *en masse*, means for properly arranging the splints, a device receiving the splints endwise direct from the said holding means properly separated, plungers for forcing and delivering the splints to the device, rotary wheels having a sliding connection with the device, a carrier, and means for forcing the device radially in the wheels to stick the splints in the carrier.

J. A. EKIN CRISWELL.

Witnesses:
JOHN H. HAZLETON,
A. W. STANLEY.